US006382884B1

(12) United States Patent
Harmand et al.

(10) Patent No.: US 6,382,884 B1
(45) Date of Patent: May 7, 2002

(54) CUTTING TOOL AND METHOD FOR MACHINING VALVE SEATS

(75) Inventors: Brice Harmand, San Diego, CA (US); Pierre Harmand, Annecy (FR)

(73) Assignee: Harmand Family Limited Partnership, San Diego, CA (US)

( * ) Notice: Subject to any disclaimer, the term of this patent is extended or adjusted under 35 U.S.C. 154(b) by 0 days.

(21) Appl. No.: 09/523,438

(22) Filed: Mar. 10, 2000

Related U.S. Application Data

(63) Continuation of application No. 09/153,766, filed on Sep. 15, 1998, now Pat. No. 6,086,293.
(60) Provisional application No. 60/081,481, filed on Apr. 13, 1998.

(51) Int. Cl.$^7$ ............................................. B23B 35/00
(52) U.S. Cl. ...................... 408/1 R; 408/3; 408/83.5; 82/1.4
(58) Field of Search ..................... 408/82, 83.5, 147, 408/151–153; 82/1 R, 3, 1.2, 1.4

(56) References Cited

U.S. PATENT DOCUMENTS

| 3,902,386 | A | * | 9/1975 | Dressler et al. ............... 82/1.4 |
| 4,789,280 | A | * | 12/1988 | Dobat et al. ................ 409/233 |
| 5,001,871 | A | | 3/1991 | Harmand |
| 5,044,841 | A | * | 9/1991 | Biera et al. .................... 82/1.4 |
| 5,613,809 | A | | 3/1997 | Harmand |
| 5,725,335 | A | | 3/1998 | Harmand |
| 5,829,928 | A | | 11/1998 | Harmand |
| 6,086,293 | A | * | 7/2000 | Harmand et al. ........... 408/83.5 |

\* cited by examiner

Primary Examiner—Steven C. Bishop
(74) Attorney, Agent, or Firm—Eleanor M. Musick, Esq.; Kilpatrick Stockton LLP

(57) ABSTRACT

The cutting tool for machining valve seats comprises a driving system, a machining head, a pilot, a depth gauge, and a system controller. The driving system provides rotational movement and vertical movement for the machining head which is controlled by the system controller. The machining head further comprises a pinion feed driving assembly and a universal cutting blade. The pinion feed driving assembly causes the cutting radius of the cutting tool to decrease as the machining head rotates. The pilot is attached to the bottom of the machining head to provide a means for centering the cutting tool. The depth gauge is disposed on the driving system and is electrically connected to the system controller. The depth gauge measures the distance between a valve seat and the cutting blade. The system controller includes memory and programming for controlling the operation of the cutting tool. An operator can input the parameters that define the geometry of the valve seat profile. These parameters are used by the system controller to determine the rotational speed and the vertical feed of the machine spindle. The method for machining valve seats comprises four steps. First, a cylinder head is secured beneath the cutting tool and a valve seat is centered using the fixed pilot of the cutting tool. Second, the vertical feed rate of the machine spindle, the length of the vertical displacement of the spindle to machine the segment, and the number of rotations needed to machine a segment of the valve seat profile are calculated by the system controller from input parameters of the valve seat profile. Third, the system controller adjusts the vertical feed rate to cut each segment according to the desired valve seat profile. Fourth, the system controller returns the cutting blade to its original position.

20 Claims, 7 Drawing Sheets

| | |
|---|---|
| STEP 1 | SECURE CYLINDER HEAD AND ALIGN VALVE SEAT WITH FIXED PILOT |
| STEP 2 | INPUT PARAMETERS TO SYSTEM CONTROLLER AND DETERMINE VERTICAL FEED RATE NUMBER OF ROTATIONS, AND LENGTH OF VERTICAL DISPLACEMENT USING EQUATIONS 6, 9 AND 13 |
| STEP 3 | ADJUST VERTICAL FEED RATE AND ROTATIONAL SPEED THROUGH SYSTEM CONTROLLER TO MACHINE THE DESIRED PROFILE |
| STEP 4 | REPOSITION THE CUTTING BLADE BACK TO ITS ORIGINAL POSITION |

FIG. 8

CUTTING TOOL AND METHOD FOR MACHINING VALVE SEATS

RELATED APPLICATIONS

This application is a continuation of U.S. application Ser. No. 09/153,766, filed Sep. 15, 1998, now issued as U.S. Pat. No. 6,086,293, which claims the benefit of priority under 35 U.S.C. §119(e) to U.S. provisional application Ser. No. 60/081,481, filed Apr. 13, 1998, the subject matter of which is incorporated by reference.

BACKGROUND OF THE INVENTION

In internal combustion engines, it is essential that the cylinders be sealed completely airtight when the valves are closed to ensure efficient fuel consumption and transfer of power. This airtightness is achieved, among other things, by assuring that the valve heads perfectly match the valve seats. Since contact surfaces of the valves and valve seats are subject to wear and other degrading factors that effect the contact surface textures, these surfaces must be modified to re-establish the high quality seal.

It is well known among vehicle mechanics that valve seats can be machined to remove the outer surface of the seat to expose a smooth and uniform contact surface by a technique commonly referred to as "lapping". This lapping technique is accomplished by removing the cylinder head from the engine and machining the valve seats with a cutting blade. Typically, a valve seat has a profile with three different angles: a throat angle, a valve seat angle, and a top angle. Thus, a "three-angle" cutting blade or bit is used to machine a valve seat wherein each angle of the three-angle cutting blade corresponds to one of the valve seat angles to be machined. Three-angle cutting blades vary in size and shape depending on the type of cylinder head valve seat being machined. These three-angle cutting blades are currently used by all current valve seat and guide manufacturers including Berco, AZ, AMC, Vereco, Mira, Peterson, Robbi, Kwik-Way, DCM, Kansas Instruments, Sunnen, Serdi, NEWEN, T&S, Winona Van Norman, etc.

A disadvantage of the lapping technique is the risk of damage to the surface finish from vibrations, chattering, or undulations generated from flexion of the cutting bits. This problem develops because certain large-diameter cylinder head valve seat shapes require a three-angle cutting blade with a long cutting edge/surface. Cutting efforts with this long cutting edge/surface create flexions at the level of the spindle of the cutting or on the cylinder head, especially when dealing with valve seat material that is difficult to machine. These flexions generate vibrations, chattering, or undulations which, in turn, damage the surface finish of the valve seat making the quality of the work unacceptable by OEM (original equipment manufacturer) standards.

Another disadvantage of the lapping technique is a de-centering phenomena. As stated above, cutting efforts with a long cutting edge/surface create flexions. These flexions create an unbalanced radial cutting effort which de-centers the three-angle cutting blade.

Still another disadvantage of the lapping technique is the large number of three-angle cutting blades needed to machine different types of valve seats. Each type of engine has a different valve seat profile. Thus, one or more unique three-angle cutting blades may be needed for each type of engine.

In view of the aforementioned inadequacies of the prior art, the need exists for a cutting tool and a method to machine valve seats that substantially reduces flexions during machining and uses a universal cutting blade.

SUMMARY OF THE INVENTION

It is an advantage of the present invention to provide one universal cutting bit and bit holder having the ability to precisely machine an unlimited number of valve seat shapes.

It is an advantage of the present invention to substantially reduce flexion of the cutting bit during valve seat machining.

It is another advantage of the present invention to eliminate de-centering phenomena due to unbalanced radial efforts from flexion.

Yet another advantage of the present invention is to eliminate vibrations, chattering, and undulations to provide improved roundness in a valve seat.

In an exemplary embodiment, the present invention is a machining head comprising a fixed sleeve, a carriage head, a carriage head holder, a pinion feed driving assembly, and a universal cutting blade. The fixed pilot is attached to the bottom of the carriage head along the z-axis of a machine spindle. The carriage head holder attaches to the lower end of the machine spindle so that when the machine spindle is rotated, the machining head rotates. The carriage head is attached to the carriage head holder at an inclined angle relative to the bottom surface of the carriage head. The fixed sleeve is attached to a spindle sheath and provides cooperation with the pinion feed driving assembly to move the carriage head inward or outward when the machine spindle is rotated. The universal cutting blade is mounted on the carriage head through one of a plurality of mounting holes. The machining head can be utilized with virtually any conventional valve seat machining system, but is preferably used with the system disclosed in U.S. Pat. No. 5,725,335 of the present inventors.

The exemplary embodiment comprises a driving system, a machining head, a pilot, a depth gauge, and a system controller. The driving system further comprises a machining sphere, a machine spindle, a spindle sheath, a drive motor, a linkage, and a stepper motor. The spindle sheath is disposed within and supported by the machine sphere. The spindle sheath is fixed within the x- and y- axis, but can move along the z-axis by the stepper motor. The stepper motor is electrically connected and controlled by the system controller. The machine spindle is disposed within the spindle sheath and rotates around its z-axis through a drive motor and transmission linkage. The drive motor rotating the machine spindle is electrically connected to and controlled by the system controller.

The depth gauge is disposed on the spindle sheath by a fixed arm and is electrically connected to the system controller. The depth gauge measures the distance between a top surface of a cylinder head and the cutting blade.

The system controller includes a memory which contains software for controlling the operation of the cutting tool. This system controller includes a user interface at which an operator can input the parameters that define the geometry of a valve seat profile. These parameters are used by the system controller to determine the vertical feed rate of the machine spindle, the length of the vertical displacement of the spindle to machine the segment, and the number of rotations needed to machine a segment of the valve seat profile. The system controller uses a look-up table stored externally or within internal memory and the input information is used to determine the vertical feed rate of the machine spindle, the length of the vertical displacement of the spindle to machine the segment, and the number of rotations needed to machine a segment of the valve seat profile. The operator simply needs to center the spindle, activate the system after the initial input of information for a given cylinder head and valve seat profile, and re-center on each subsequent valve seat before activation.

The method for machining valve seats comprises four steps. First, a cylinder head is secured beneath the cutting tool and a valve seat is centered using the fixed pilot of the cutting tool. Second, the vertical feed rate of the machine spindle, the length of the vertical displacement of the spindle to machine the segment, and the number of rotations needed to machine a segment of the valve seat profile are calculated by the system controller from input parameters of the valve seat profile. Third, the system controller adjusts the vertical feed rate to cut each segment according to the desired valve seat profile and positions the cutting bit to an initial position. In one embodiment the initial position is a point radially farthest from the center of the valve seat. The rotation of the spindle moves the carriage head and cutting bit radially inward as the vertical feed rate is adjusted for each segment of the valve seat profile. Fourth, the system controller returns the cutting blade to its initial position through lifting the spindle and reversing the spindle rotation by the exact number of rotations used to machine the valve seat.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to parts, and in which:

FIG. 8 is a block diagram showing the steps of the method for machining valve seats; FIG. 9a shows the starting point, FIG. 9b shows the completion of the first radius; FIG. 9c, the second radius, and FIG. 9d, the third radius.

DETAILED DESCRIPTION OF THE PREFERRED EMBODIMENT

The cutting tool for machining valve seats comprises a driving system with a z-axis adjustable spindle, a depth gauge, a pilot, a machining head, and a system controller. The cutting tool is preferably according to the disclosure of Harmand, et al. in U.S. Pat. No. 5,725,335, which is incorporated herein by reference. The method for machining a valve seat with a universal cutting blade is based upon the observation that any taper angle can be described by simultaneously varying the height and cutting radius of the cutting tool. Cutting radius is defined as the distance from the cutting blade to the z-axis of the spindle. Thus, the invention can describe and machine an unlimited number of different taper angles within a single valve seat profile by continuously varying both the z-axis of the spindle and the cutting radius of the cutting tool. Specifically, a valve seat taper angle can be described by only varying the z-axis feed rate of the spindle when the spindle rotation varies the cutting radius of the cutting tool through a gearing system. Alternatively, a valve seat taper angle can be described by only varying the rotational speed of the spindle while the z-axis feed rate of the spindle remains constant.

The machining head is attached to the spindle and rotated by the driving system. The machining head further comprises a carriage head holder, a pinion feed driving assembly, a fixed angle carriage head, and a universal cutting blade. The pilot is attached to the bottom surface of the machining head along the z-axis of the spindle. The carriage head is disposed at a fixed angle to the carriage head holder. The cutting radius of the carriage head varies through cooperation with the z-axis adjustable spindle and a gearing system. A universal cutting blade with one edge is disposed on one of a plurality of mountings on the carriage head. The depth gauge is disposed on the driving system to aid the z-axis spindle feed rate adjustment by determining the height of the cutting blade relative to the valve seat. The z-axis spindle feed rate adjustment can be accomplished by manual means or control means well-known to one of ordinary skill in the art such as a computer, a logic gate array, or a dedicated microprocessor.

Figure 1:
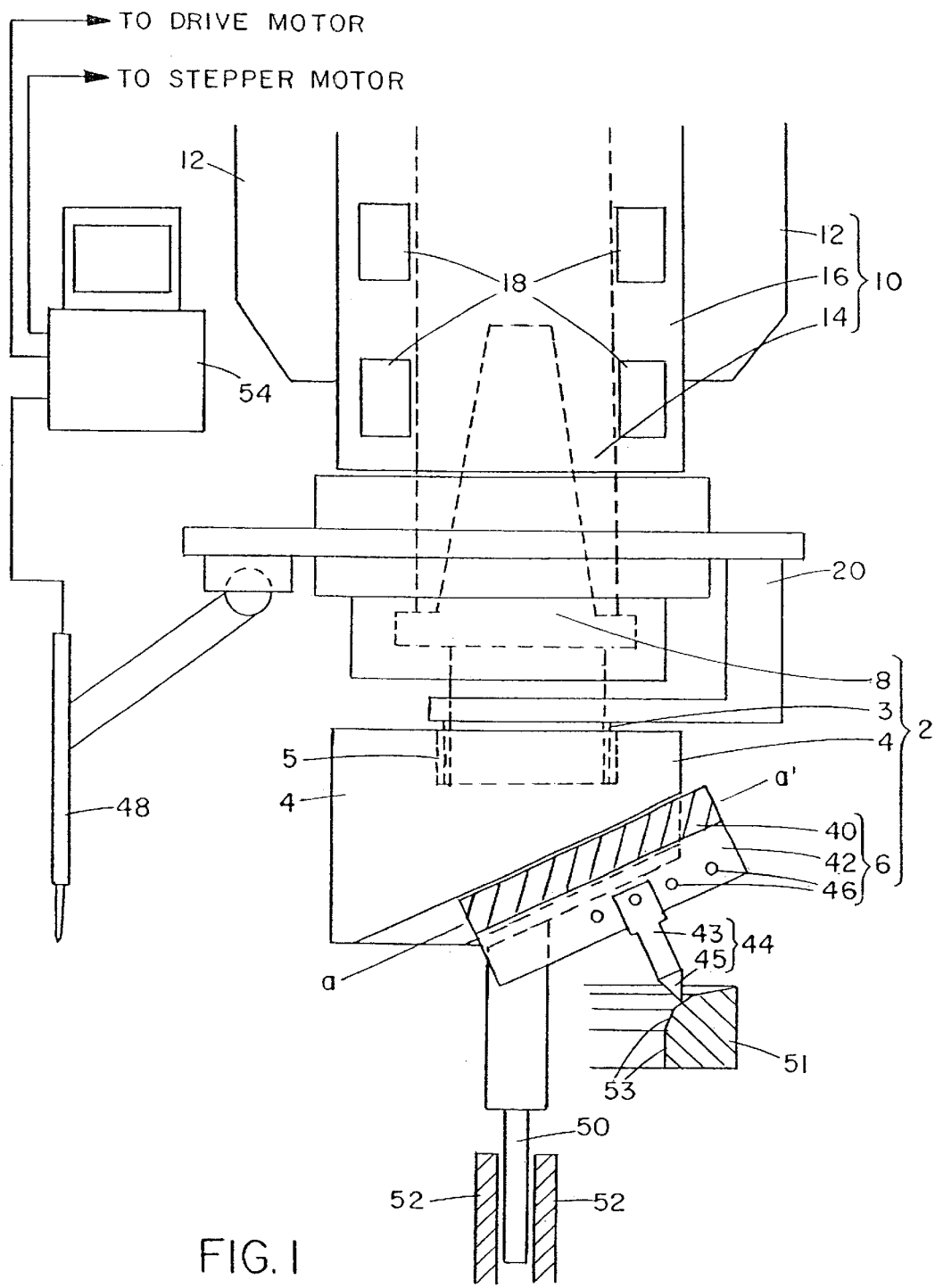
FIG. 1 is a diagrammatic front view of the cutting tool.

In an exemplary embodiment, as illustrated in FIG. 1, a driving system 10 comprises a drive motor (not shown), a transmission linkage (not shown), a stepper motor (not shown), a machine sphere 12, a machine spindle 14, and a spindle sheath 16 having an upper end and a lower end. The upper end of spindle sheath 16 is disposed within machine sphere 12 which provides support for spindle sheath 16. Alternatively, spindle sheath 16 can be supported by any conventional means known in the art such as a pantograph or multi-jointed arms. Spindle sheath 16 is mounted within machine sphere 12 which provides angular adjustment of spindle sheath 16. The framework (not shown), within which machine sphere 12 is supported, provides small x-y adjustment. Spindle sheath 16 can move along the z-axis by any conventional translation means such as a stepper motor. The stepper motor is electrically connected to a system controller 54 which controls the stepper motor. Alternatively, spindle sheath 16 can be translated manually, or by other known mechanical means along the z-axis.

Machine spindle 14 has a distal end and is disposed within spindle sheath 16. Machine spindle 14 has an inside wall forming a cavity near its distal end adapted for connection to machining head 2. A plurality of spindle bearings 18 allows machine spindle 14 to rotate around its z-axis. Machine spindle 14 is rotated by a drive motor through any conventional means such as transmission linkage, direct connection, or universal joint linkage. Machine spindle 14 is preferably rotated by a drive motor through a transmission linkage. The drive motor rotating machine spindle 14 is electrically connected to system controller 54 which controls the drive motor.

Figure 4:
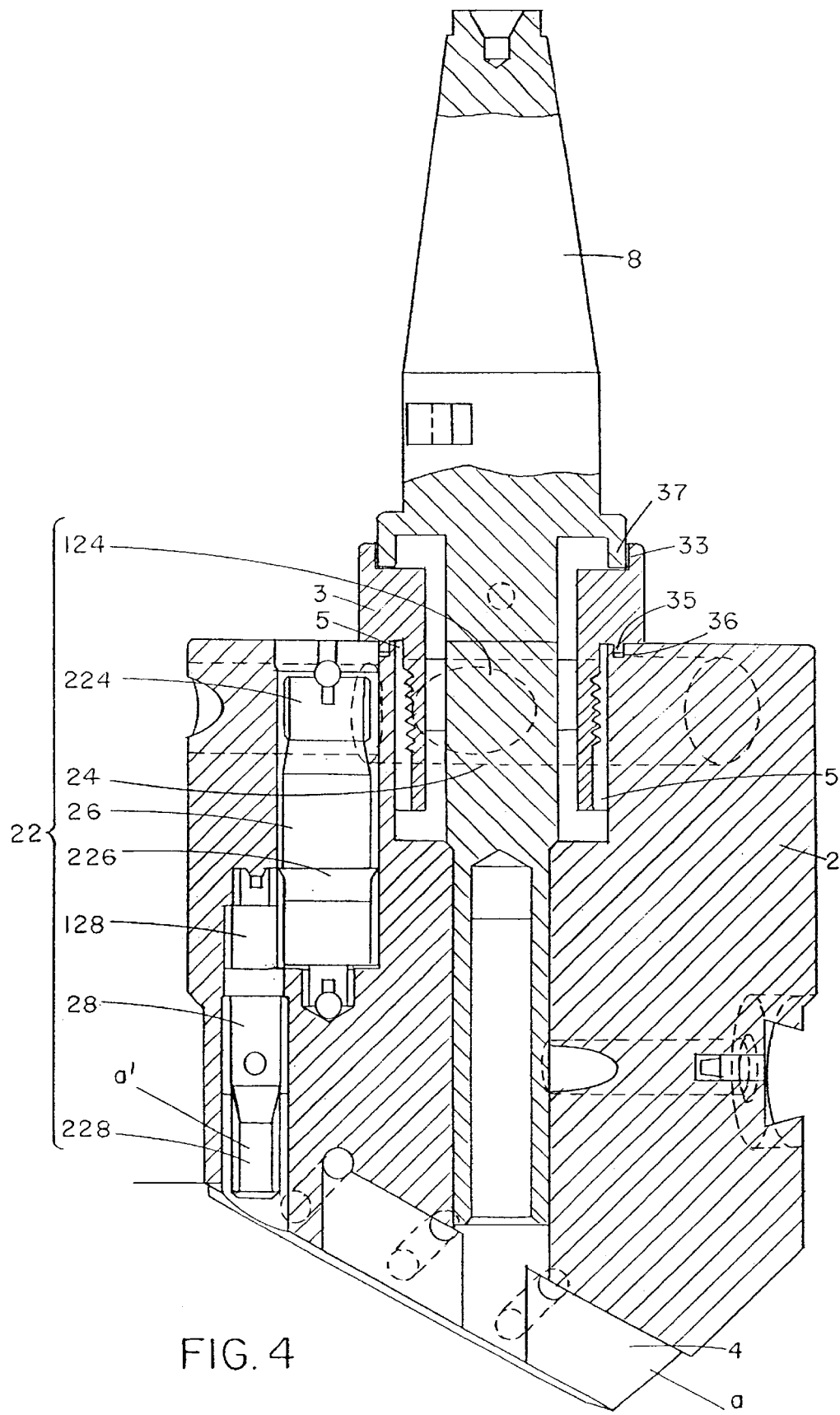
FIG. 4 is a side view, partially cut away, of the machining head, showing the pinion drive gearing system.
Figure 5:
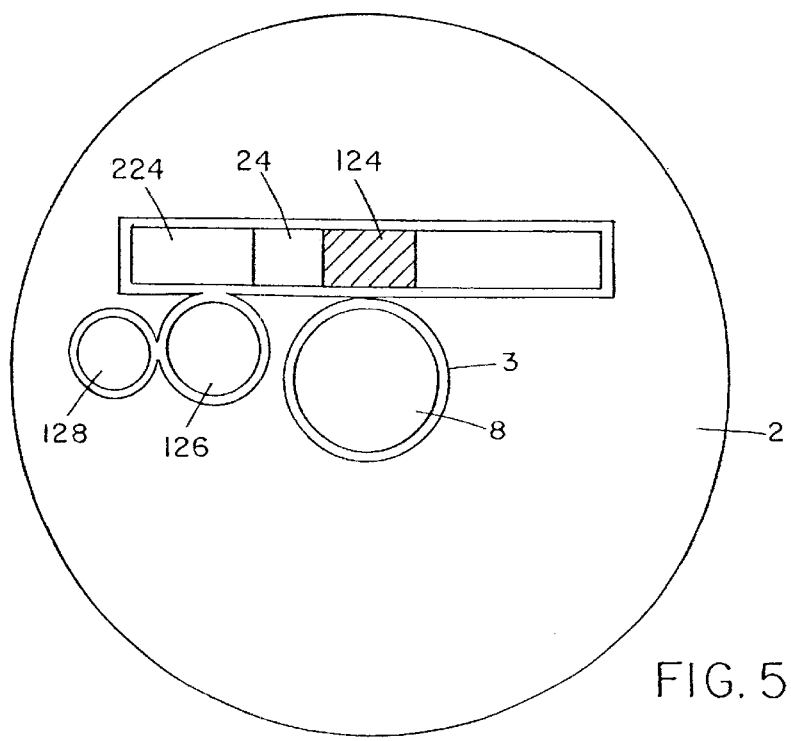
FIG. 5 is a diagrammatic top view, partially cut away, of the machining head, showing the pinion feed driving assembly.

Referring to FIG. 4, machining head 2 comprises a taper adapter 8, a fixed sleeve 3, a carriage head holder 4, a pinion feed driving assembly 22, a carriage head 6, and a universal cutting blade 44. Taper adapter 8 has an upper portion, a middle portion, and a lower portion. The upper portion of taper adapter 8 is adapted to cooperate with the cavity near the distal end of machine spindle 14 so that taper adapter 8 is rotated by machine spindle 14. The lower portion of taper adapter 8 is attached to carriage head holder 4 so that when machine spindle 14 is rotated, carriage head holder 4 also rotates.

Carriage head holder 4 has a top having a cavity 5 adapted to receive fixed sleeve 3 and machine spindle 14. Machine spindle 14 extends through fixed sleeve 3 to attach to the bottom of cavity 5 to rotate machining head 2 when machine spindle 14 is rotated. Fixed sleeve 3 cooperates with carriage head holder 4 to help prevent vibration and chattering. Fixed sleeve 3 does not rotate or move relative to spindle sheath 26.

Fixed sleeve 3 is attached to spindle sheath 16 through means well-known to one of ordinary skill in the art such as a support arm 20. Support arm 20 has a vertical portion and a horizontal portion. The vertical portion of support arm 20 has a top end and a bottom end wherein the top end is attached to the lower end of spindle sheath 16. The horizontal portion of support arm 20 has a proximal end and a distal end wherein the proximal end is attached to the bottom end of the vertical portion of support arm 20. The distal end of support arm 20 is attached to fixed sleeve 3.

Figure 3:
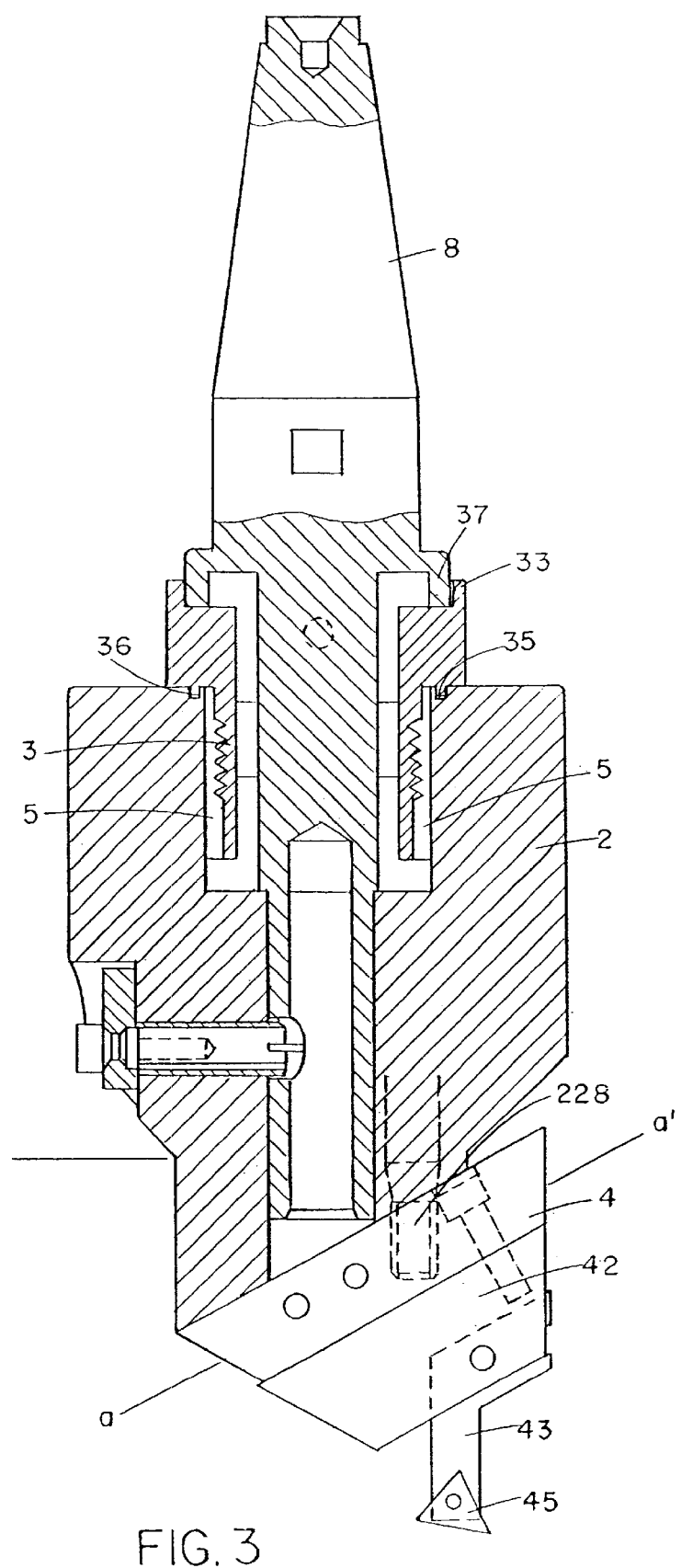
FIG. 3 is a front view, partially cut away, of the machining head and spindle.

Referring to FIG. 3 and FIG. 4, taper adapter 8 is adapted to rotate freely within fixed sleeve 3. Fixed sleeve 3 has a top portion and a bottom portion. The top portion of fixed sleeve 3 has an upward annular flange 33 extending upward and a downward annular flange 35 extending downward. The middle portion of taper adapter 8 has an annular flange 37 extending slightly downward. Upward annular flange 33 has a slightly larger diameter than annular flange 37 and interfits with annular flange 37 to help prevent taper adapter 8 from vibrating or moving within the x- and y- axis. Downward annular flange 35 mates with an annular channel 36 on the top surface of carriage head holder 4 to help provide additional stability against vibration or movement within the x- and y- axis. The lower portion of fixed sleeve 3 is threaded and disposed within cavity 5 formed on the top of carriage head holder 4. The thread on the bottom portion of fixed sleeve 3 is adapted to cooperate with a pinion feed driving assembly 22.

Fixed pilot 50 attaches to the bottom surface of carriage head holder 4 so that fixed pilot 50 is aligned along the z-axis of machine spindle 14. Fixed pilot 50 fits closely within a valve guide 52 of an engine cylinder head to aid in centering machining head 2. Selection of an appropriate pilot is within the level of skill in the art.

Figure 2:
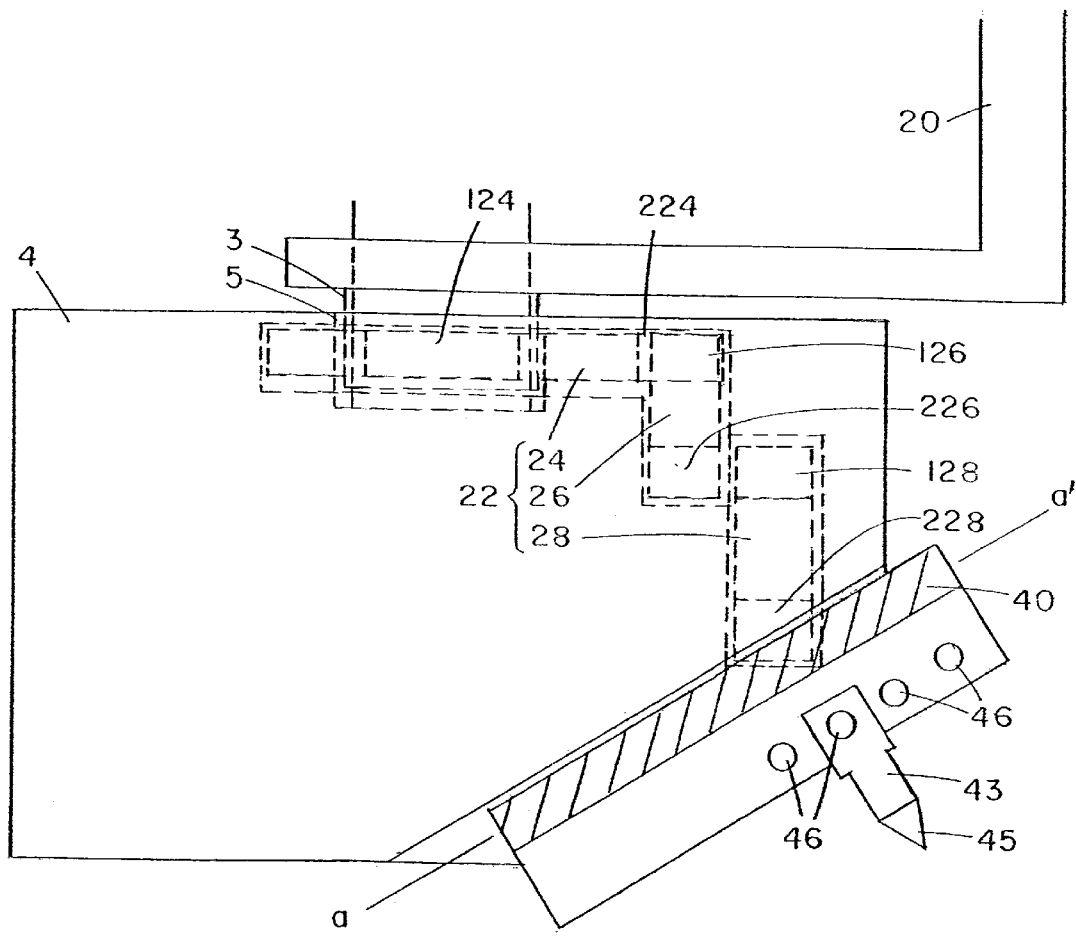
FIG. 2 is a diagrammatic front view of the machining head of the cutting tool.

Referring to FIG. 2, pinion feed driving assembly 22 comprises a geared horizontal member 24, a pinion arbor 26, and a geared vertical member 28. Carriage head holder 4 has interior walls forming three bores which are slightly larger than pinion feed driving assembly 22. These bores within carriage head holder 4 are adapted to support pinion feed driving assembly 22 and to allow the members of the pinion feed driving assembly 22 to rotate freely within the bores of carriage head holder 4.

Geared horizontal member 24 comprises a proximal gear 124 and a distal gear 224. Geared horizontal member 24 has a proximal end and a distal end. Proximal gear 124 is attached to the proximal end of geared horizontal member 24 and is adapted to cooperate with the thread on fixed sleeve 3 so that when machining head 2 is rotated, geared horizontal member 24 rotates. Distal gear 224 is attached to the distal end of geared horizontal member 24 and is adapted to cooperate with and rotate pinion arbor 26. Pinion arbor 26 comprises a first gear 126 and a second gear 226. Pinion arbor 26 has a top end and a bottom end. First gear 126 is attached to the top end of pinion arbor 26 and second gear 226 is attached to the bottom end of pinion arbor 26. First gear 126 is adapted to cooperate with distal gear 224. Second gear 226 is adapted to cooperate with geared vertical member 28. Geared vertical member 28 comprises a top gear 128 and a bottom gear 228. Top gear 128 is attached to geared vertical member 28 to the end closest to pinion arbor 26. Top gear 128 cooperates with second gear 226 so that when pinion arbor 26 is rotated, geared vertical member 28 rotates. Bottom gear 228 is attached to geared vertical member 28 to the end farthest to pinion arbor 26. Bottom gear 228 cooperates with carriage head 6 so that when geared vertical member 28 is rotated, carriage head 6 moves along line a–a' shown in FIG. 1. A number of configurations for pinion feed driving assembly 22 are well known, and a person of ordinary skill in the art would recognize that alternative gear assemblies may be used to provide the desired movement.

Carriage head 6 further comprises a toothed rack 40 and a cutting blade holder 42. Carriage head 6 is slidably attached to carriage head holder 4 at an inclined angle relative to the bottom surface of carriage head holder 4. Toothed rack 40 cooperates with geared vertical member 28 so that carriage head 6 is moved along line a–a' when geared vertical member 28 is rotated. The outward movement of carriage head 6 along line a–a' increases the cutting radius of carriage head 6. Cutting radius is defined as the radial distance from a cutting blade 44 to the z-axis of the machine spindle 14. Likewise, the inward movement of carriage head 6 along line a–a' decreases the cutting radius. Thus, the rotation of machine spindle 14 provides rotational movement for carriage head holder 4 and linear movement along line a–a' for carriage head 6 through pinion feed driving assembly 22. The movement of carriage head 6 along line a–a' can be accomplished through other conventional means known to one of ordinary skill in the art such as a belt and pulley configuration.

Cutting blade holder 42 provides means for mounting a cutting blade 44. A variety of mounting means are well-known in the art such as nut-bolt and screw-thread configurations. In the preferred embodiment, cutting blade holder 42 has a surface defining a plurality, of mounting holes 46. Cutting blade 44 can be mounted to any one of the plurality of mounting holes 46 to provide larger scale adjustment of the cutting radius by varying the starting point of cutting tip 45.

Cutting blade 44 has a proximal end and a distal end. Cutting blade 44 comprises mounting surface 43 on the proximal end and cutting tip 45 on the distal end. Cutting tip 45 has one edge. Alternatively, cutting tip 45 can have a plurality of edges. Mounting surface 43 is disposed on cutting blade holder 42 through any one of the plurality of mounting holes 46.

Depth gauge 48 is disposed on the spindle sheath 16 by a moveable arm or by any conventional means known in the art such as clamps or solder. Depth gauge 48 can be a linear gauge which contacts the surface of the cylinder head for measuring the distance between a valve seat and cutting blade 44. Other means for measuring distance may be used, as are known in the art, including optical measurement techniques, e.g., lasers. Depth gauge 48 is electrically connected to a system controller 54 to provide feedback for control of feed rate and depth. Alternatively, depth gauge 48 can be connected to an output display.

System controller 54 includes memory and programming for controlling the operation of the cutting tool. System controller 54 can be any control means well-known to one of ordinary skill in the art such as a computer, a transputer, a logic gate array, or a dedicated microprocessor. Preferably, system controller 54 is a computer with a touch-screen display. Other operator interfaces may be used including keypads or smart card readers. An operator can input the parameters that define the geometry of the valve seat profile. System controller 54 uses these parameters to determine the vertical feed rate for machine spindle 14, the length of the vertical displacement of machine spindle 14 to machine the segment, and the number of rotations needed to machine a segment of the valve seat profile. With such information in memory, the operator needs only to center machine spindle 14, select the appropriate valve seat profile, then allow the system to control itself. For example, the operator enters the type of engine to be machined into system controller 54. Then, system controller 54 uses a look-up table stored externally or within internal memory and the input information is used to determine the number of rotations and the vertical feed speed of machine spindle 14 in order to bring the valve seats within OEM specifications or to meet other desired specifications. The operator simply needs to activate the system after the initial input of the appropriate information for the subject cylinder. The spindle 14 is re-center on each subsequent valve seat before activation. The system controller can use either internal memory or external memory such as "smart card" or a memory card.

In an embodiment using a memory card, each memory card is dedicated to a single cylinder head, or family of cylinder heads such that, by inserting the memory card into a memory card reader, the specific parameters of a particular machining task is loaded into system controller 54. This ensures that whoever is using the cutting tool, regardless of their experience level or personal preferences, will machine the cylinder head according to the specifications stored on the memory card. Because of the ease of programming and reading the memory card, particular customers may wish to have their own dedicated memory card. In fact, there could be a memory card for each family of cylinder heads, such as Ford, Chevrolet, etc., which would store the optimum machining characteristics for each.

In addition to storing set-up parameters after the operator has determined the required procedure for a given cylinder head, the memory card can also have dimensional specifications and/or set-up parameters selected and stored by the vehicle OEM, so that machining can be done in accordance with the manufacturer's specifications, assuring uniformity from engine to engine of the same type, and facilitating repairs where a repair shop services a large number of the same make and model of a given vehicle.

The memory card, commonly called a "smart card" or "token smart card" which is available from a ELEA, or GEMPLUS, both of France (where the smart card originated), as well as being available from a number of different manufacturers worldwide. (See, e.g., Bright, *Smart Cards: Principles, Practice, Applications*, Holsted Press, 1988.) Such cards use either a programmable microchip or a magnetic strip on its back side to store up to 256 bytes of information. The memory card device is a commercially available card reader which is electronically interfaced to system controller 54. Thus, once the memory card is inserted into the card reader, the digital information which is stored on the card is retrieved by system controller 54 to automatically set up the machining of the cylinder head. As this method of storing information is common in other fields, the details of the particular method of encoding and decoding the digital information from the memory card is not discussed here.

Referring to FIG. 8, the method for machining valve seats may be used for machining valve seats of virtually any shape using a universal cutting blade. The only limitation is that the radius of the valve seat must be smaller than the cutting radius of carriage head 6. The method comprises coordinating the feed rate of the z-axis translation of machine spindle 14 with the cutting radius of carriage head 6. Coordination can be accomplished manually, however, coordination through system controller 54 is preferred. The method for machining valve seats comprises four steps.

First, a valve seat is centered using the fixed pilot of the cutting tool. Second, the vertical feed rate, the length of the vertical displacement of machine spindle 14 to machine the segment, and the number of rotations for each segment of the valve seat profile are calculated by system controller 54 from input parameters of the valve seat profile. Third, system controller 54 adjusts the vertical feed rate of machine spindle 14 to cut each segment according to the desired valve seat profile. Fourth, system controller 54 returns the cutting blade to its original position.

In the first step, a cylinder head valve seat is secured into position beneath machining head 2 through any conventional means known to one of ordinary skill in the art such as a stand with adjustable multi-direction clamps. The cylinder head is positioned so that valve guide 52 is aligned with both fixed pilot 50 and the z-axis of machine spindle 14. This alignment can be accomplished by a number of techniques known to one of ordinary skill in the art such as adjusting the position of the cylinder head or machining head 2.

In the second step, the parameters that define the geometry of the profile of the valve seat are inputted to system controller 54 by an operator. The parameters can be input directly using Cartesian coordinates (x,y) or polar coordinates (length, angle). Alternatively, the parameters can be retrieved from a pre-established database of valve seat profiles. The preestablished database can be retrieved from internal memory or external memory such as a "smart card". Once the valve seat profile is input, system controller 54 decomposes the valve seat profile into a number of segments. Then, the vertical feed speed and direction of machine spindle 14 is computed for each of these segments according to the number of rotations needed and the angle of the segment. The starting and finishing points are the length of the segment and the coordinates of the preceding segment. The programming of system controller 54 is derived from the configuration of the cutting tool, the input parameters, and trigonometry.

Figure 6:
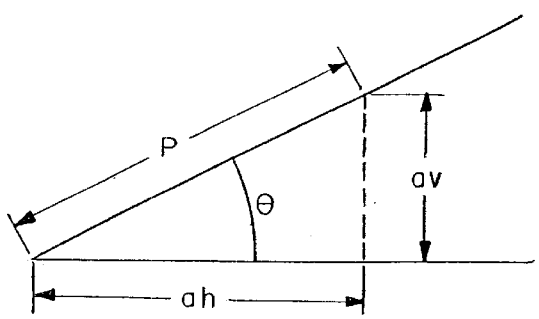
FIG. 6 is a geometrical representation of the feed per revolution of the carriage head according to its inclination angle.

A formula to determine F (the vertical feed per revolution of machine spindle 14) for each segment can be calculated from P (the feed per revolution of the carriage according to its inclination angle), $\theta$ (the angle of carriage with respect to the horizontal), and a (the angle of the segment). Referring to FIG. 6, where:

P=feed per revolution of the carriage according to its inclination angle.

ah=horizontal feed per revolution of the carriage av=vertical feed per revolution of the carriage $\theta$=angle of the carriage with respect to the horizontal The values for ah and av are calculated according to simple trigonometric functions for the base and height of a right triangle.

$$ah = P^* \cos \theta \quad (1)$$

$$av = P^* \sin \theta \quad (2)$$

Figure 7:
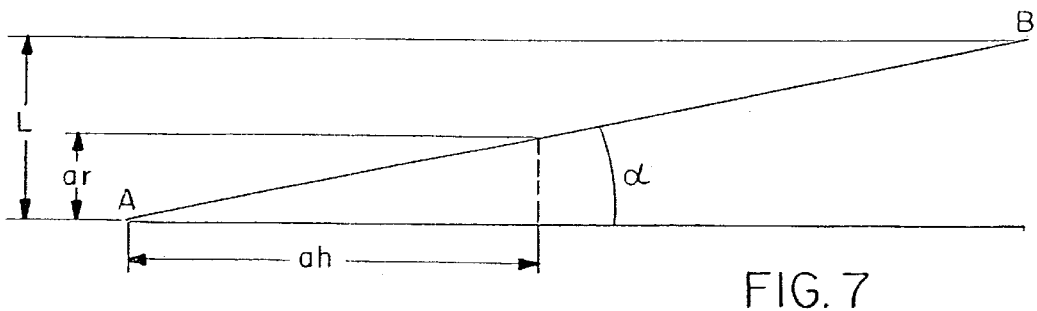
FIG. 7 is a geometrical representation of a segment length of a valve seat profile.

Referring to FIG. 7, where:

AB=segment length

α=angle of the segment

L=vertical projection of the segment ar=resulting feed per revolution due to the feed rate of the carriage and to the vertical movement of machine spindle 14.

The value for ar is derived according to the simple trigonometric function:

$$ar = ah * \tan \alpha \tag{3}$$

Now, substituting for ah using equation (1):

$$ar = P * \cos \theta * \tan \alpha \tag{4}$$

The vertical feed per revolution of machine spindle 14, F, can be determined using ar and av. By definition:

$$ar = av + F \tag{5}$$

where,

F=vertical feed per revolution of machine spindle 14

Now, rearranging Equation 5 and substituting for ar and av from Equations 4 and 2:

$$F = ar - av$$

$$F = P(\cos \theta * \tan \alpha - \sin \theta) \tag{6}$$

The number of rotations that machine spindle 14 must complete to machine the segment, N, and the length of the vertical displacement of machine spindle 14 to machine the segment, d, can be determined from AB, α, and θ.

N=number of rotations that machine spindle 14 must complete to machine the segment d=length of the vertical displacement of machine spindle 14 to machine the segment By definition:

$$L = ar * N \tag{7}$$

Using the trigonometric relationship:

$$L = AB * \sin \alpha \tag{8}$$

Substituting for ar using equation (4):

$$N = L/ar = (AB * \sin \alpha)/(P * \cos \theta * \tan \alpha)$$

Thus, $$N = (AB * \cos \alpha)/(P * \cos \theta) \tag{9}$$

By definition, $$d = F * N \tag{10}$$

Substituting for F and N using equation (6) and (10)

$$d = P(\cos \theta * \tan \alpha - \sin \theta) * (AB * \cos \alpha)/(P * \cos \theta) \tag{11}$$

Rearranging equation (12):

$$d = [AB/\cos \theta] * [\cos \alpha (\cos \theta * \tan \alpha - \sin \theta)] \tag{12}$$

Expanding equation (13):

$$d = [AB/\cos \theta] * [(\cos \alpha * \cos \theta * \sin \alpha / \cos \alpha) - (\cos \alpha * \sin \theta)]$$

$$d = [AB/\cos \theta] * [\cos \theta * \sin \alpha - \cos \alpha * \sin \theta]$$

Substituting the trigonometric identity of sin(x-y)= sinx*cosy−cosx*siny:

$$d = [AB/\cos \theta] * \sin(\alpha - \theta) \tag{13}$$

Thus, given a segment length, AB, and the angle of the segment, α, system controller 54 can calculate F (the vertical feed per revolution (vertical feed rate) of machine spindle 14), N (the number of rotations that machine spindle 14 must complete to machine the segment), and d (the length of the vertical displacement of machine spindle 14 to machine the segment).

In the third step, system controller 54 uses the values calculated from the operator input parameters as shown in Equations 6, 9, and 13 to adjust cutting blade 44 to machine the desired profile. The operation of carriage head 4 along line a–a' of FIG. 1 relies on the rotation of machine spindle 14 through pinion feed driving assembly 22. The a–a' movement depends only upon the number of rotations spindle goes through, as opposed to the speed of rotation or the movement of the z-axis spindle. The coordination of the movement of the z-axis and the cutting radius can machine any shape valve seat.

Although a number of methods can be used to accomplish this machining, it is preferably accomplished by adjusting the vertical feed rate of machine spindle 14 for each segment while keeping the rotational speed of machine spindle 14 constant. Alternatively, system controller 54 can machine the desired profile by varying the rotational speed of machine spindle 14 while keeping the vertical feed rate constant. Also, system controller 54 can vary both the vertical feed rate and the rotational speed of machine spindle 14 to machine the desired profile.

In the preferred embodiment of the third step, the combination of machine spindle 14, carriage head 6, depth gauge 48, and fixed pilot 50 works with system controller 54 to machine any desired pattern. An operator centers the valve seat with fixed pilot 50 which fits closely within the valve guide 52 of the engine cylinder head. System controller 54 uses the input parameters from the operator and inputs from depth gauge 48 to control vertical feed rate of machine spindle 14. Machine spindle 14 rotates carriage head 6 which rotates cutting blade 44. As machine spindle 14 is rotated, the cutting radius changes as carriage head 6 is moved along line a–a'. This movement is caused by the combination of fixed sleeve 3 cooperating with pinion feed driving assembly 22 which cooperates with toothed rack 40. Depth gauge 48 contacts the surface of the cylinder head and produces an electrical signal indicative of surface distance. This signal is provided to system controller 54, which may be a dedicated microprocessor or a main system computer with a touch screen display, which, in turn provides a command to a vertical translation means such as a stepper motor to correctly adjust the initial position of the cutting blade 44.

Figure 9:
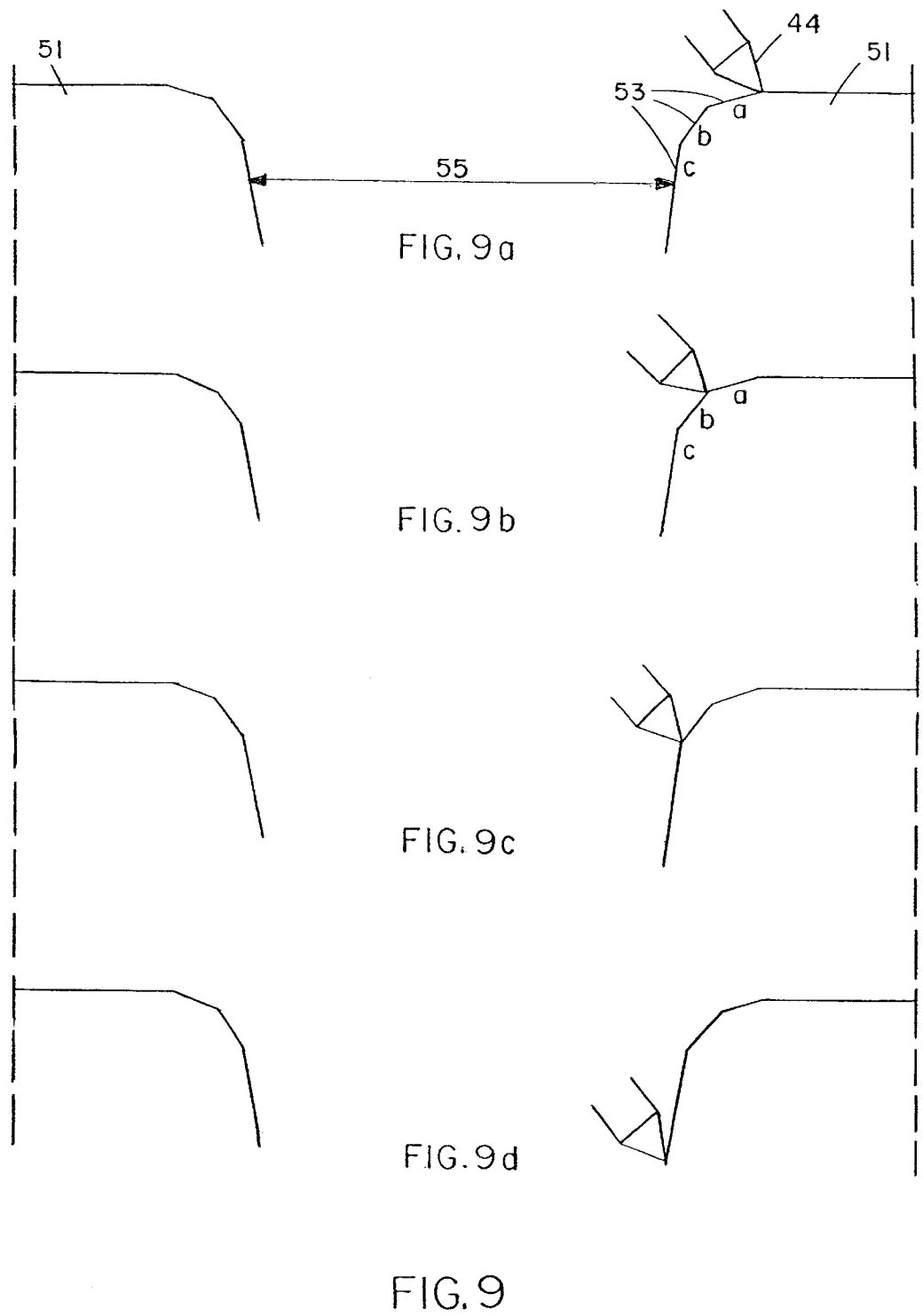
FIGS. 9a–d are diagrammatic side views of four stages of the method for machining valve seats, where

Referring to FIGS. 9a, 9d the initial position of cutting blade 44 is the same for each valve seat 55 to be machined within cylinder head 51. In one embodiment, the initial position of cutting blade 44 is the point radially farthest from the radial center of the valve seat and, system controller 54 machines each valve seat from its outermost radial point to its innermost radial point. To create the different radii or facets 53a,b,c of a three facet valve seat profile, the vertical feed rate is varied to move the cutting blade 44 at the desired fact angle according to the relationships provided in Equations 6, 9, and 13. FIG. 9b shows cutting blade 44 after completing the first radius or facet "a", FIG. 9c, the second facet "b", and FIG. 9d, the third facet "c". This example is not intended to be a limitation on the invention and one of ordinary skill in the art would recognize alternative methods. For example, in a second embodiment cutting blade 44 is at a point closest to the racial center of the valve seat while the carriage head cutting radius moves outward. Alternatively, the initial position of cutting blade 44 can be anywhere along the radius of the valve seat while system controller 54 first machines outwardly, then returns to the initial position to machine inwardly.

Following completion of the final radius, system controller 54 moves cutting blade 44 back to its original position. System controller 54 accomplishes this movement by translating the z-axis of machine spindle 14 to its original height. Then, system controller 54 returns carriage head 6 to its original cutting radius by rotating machine spindle 14 in reverse by the exact number of rotations used to machine the entire valve seat. However, one of ordinary skill in the art would recognize alternative methods to accomplish the same result. While not as efficient in the number of steps, carriage head 6 can be disengaged and the z-axis of machine spindle 14 raised to higher than the original height. Then, machine spindle 14 is rotated in reverse by the exact number of rotations used to machine the entire valve seat and machine spindle 14 is lowered back to its original height.

In the present invention, a single universal cutting blade can be used on any shape valve seat. This is significant because prior art systems must use a different cutting blade for each type of valve seat shape. It is common for a prior art system to require over 100 different cutting blades to machine a large range of cylinder heads. The use of a single cutting blade saves time for machining different valve seats because the cutting blade does not have to be replaced each time a new valve seat shape is encountered. Also, the cost of obtaining many different types of cutting blades is reduced to the cost of a single universal cutting blade.

The system of the present invention further provides a smaller cutting blade. The overall cutting surface of the smaller cutting blade is smaller than a three-angle cutting blade because the smaller cutting blade has only one edge or angle. Because a smaller cutting blade has a smaller cutting surface, flexion during cylinder head valve seat machining is greatly reduced. The reduction in flexion, in turn, reduces vibrations, chattering, and undulations. It also prevents a de-centering phenomena due to unbalanced radial efforts from flexion. Thus, the inventive system provides reliable and repeatable means for machining a valve seat of virtually any shape.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

We claim:

1. A method for machining a valve seat having a desired valve seat profile utilizing a spindle situated on a vertical axis, the valve seat profile comprising a plurality of segments, each segment having a segment length and a segment angle, the method comprising the steps of:

rotating the spindle at a rotational speed, the spindle having a single point cutting tool connected to a distal end of the spindle for machining the desired valve seat profile; and for each segment of the plurality of segments, moving the single point cutting tool radially with respect to the vertical axis and vertically feeding the spindle along the vertical axis at a feed rate F determined according to the relationship $F=P(\cos\theta\cdot\tan\alpha-\sin\theta)$ for a length of vertical displacement d determined according to the relationship $d=[AB/\cos\theta]\cdot\sin(\alpha-\theta)$, where $\theta$ is the inclination angle of the carriage head, P is the feed per revolution of the carriage head, AB is the segment length and $\alpha$ is the segment angle;

wherein the rotation of the cutting tool and the radial movement and vertical feed result in the cutting tool machining the desired valve seat profile.

2. The method for machining a valve seat as in claim 1, wherein the radial movement of the cutting tool is proportional to the rotational speed of the spindle.

3. The method for machining a valve seat as in claim 1, further comprising the steps of:

centering the spindle in the valve seat; and positioning the cutting tool at an initial radial position.

4. The method for machining a valve seat as in claim 3, wherein the initial radial position is a point along the valve seat profile that is radially closest to the vertical axis, and wherein the step of moving the cutting tool comprises radially moving the cutting tool outward with respect to the vertical axis.

5. The method for machining a valve seat as in claim 3, wherein the initial radial position is a point along the valve seat profile that is radially farthest from the vertical axis, and wherein the step of moving the cutting tool comprises radially moving the cutting tool inward with respect to the vertical axis.

6. A method for machining a valve seat in an engine cylinder head wherein the valve seat has a profile comprising a plurality of segments, the method comprising:

securing the cylinder head on a work surface disposed in a horizontal plane;

disposing a machining head on a spindle adapted for axial rotation and displacement along a vertical axis, wherein the machining head comprises a slidably adjustable carriage head having an inclination angle relative to the horizontal plane and a single point cutting tool mounted to the carriage head adapted for radial movement;

centering the machining head with respect to the valve seat;

inputting a plurality of parameters for a desired valve seat profile into a system controller adapted for controlling the spindle, the plurality of parameters comprising a segment length and a segment angle for each segment of the plurality of segments;

within the system controller, calculating for each segment each of a vertical feed rate for the spindle, a length of vertical displacement of the spindle and a horizontal feed rate of the cutting tool to complete the segment, wherein:

the vertical feed rate F is calculated according to the relationship $F=P(\cos\theta\cdot\tan\alpha-\sin\theta)$; and the length of vertical displacement d is calculated according to the relationship $d=[AB/\cos\theta]\cdot\sin(\alpha-\theta)$;

where $\theta$ is the inclination angle of the carriage head, P is the feed per revolution of the carriage head, AB is the segment length and $\alpha$ is the segment angle;

positioning the cutting tool at an initial radial position of the valve seat; and in response to signals generated by the system controller, feeding the spindle at the calculated vertical feed rate for the calculated length of vertical displacement for each segment of the desired valve seat profile.

7. The method of claim 6, wherein the step of inputting further comprises the step of providing an electrical signal from a depth gauge disposed on the machining head.

8. The method of claim 6, wherein the step of calculating further comprises calculating a number of spindle rotations N for completion of each segment according to the relationship $N=(AB \cdot \cos \alpha)/(P \cos \theta)$.

9. The method of claim 6, where the step of controlling comprises adjusting the rotational speed of the spindle while keeping the vertical feed rate constant.

10. The method of claim 6, wherein the step of controlling comprises adjusting both the rotational speed and the vertical feed rate.

11. The method of claim 6, wherein the initial radial position is a point along the valve seat profile that is radially closest to the vertical axis and radial movement of the cutting tool is directed away from the vertical axis.

12. The method of claim 6, wherein the initial radial position is a point along the valve seat profile that is radially farthest from the vertical axis and radial movement of the cutting tool is directed toward the vertical axis.

13. The method of claim 6, wherein the step of centering comprises coaxially attaching a pilot from a distal end of the machining head and inserting the pilot in a valve guide corresponding to the valve seat.

14. The method of claim 6, wherein the step of positioning the cutting tool comprises attaching the cutting tool at one of a plurality of mounting holes disposed at different radial positions on the carriage head.

15. The method of claim 6, wherein radial movement of the cutting tool is effected by a driving a pinion feed driving assembly.

16. The method of claim 15, wherein axial rotation of the spindle drives the pinion feed driving assembly.

17. A method for machining a valve seat in an engine cylinder head wherein the valve seat has a profile comprising a plurality of segments, the method comprising:

securing the cylinder head on a work surface disposed in a horizontal plane;

disposing a machining head on a spindle adapted for axial rotation and displacement along a vertical axis, wherein the machining head comprises a slidably adjustable carriage head having an inclination angle relative to the horizontal plane and a single point cutting tool mounted to the carriage head adapted for radial movement in response to axial rotation of the spindle;

centering the machining head within a valve guide corresponding to the valve seat;

inputting a plurality of parameters for a desired valve seat profile into a system controller adapted for controlling the spindle, the plurality of parameters comprising a segment length and a segment angle for each segment of the plurality of segments;

within the system controller, calculating for each segment each of a vertical feed rate for the spindle, a length of vertical displacement of the spindle and radial displacement of the single point cutting tool to complete the segment, wherein:

the vertical feed rate F is calculated according to the relationship $F=P(\cos \theta \cdot \tan \alpha - \sin \theta)$; and the length of vertical displacement d is calculated according to the relationship $d=[AB/\cos \theta] \cdot \sin(\alpha - \theta)$;

where $\theta$ is the inclination angle of the carriage head, P is the feed per revolution of the carriage head, AB is the segment length and $\alpha$ is the segment angle;

positioning the cutting tool at an initial radial position of the valve seat; and for each segment of the desired valve seat profile, in response to signals generated by the system controller, rotating the spindle and feeding the spindle at the calculated vertical feed rate for the calculated length of vertical displacement; wherein rotation of the spindle drives radial movement of the single point cutting tool for traversing the segment length.

18. The method of claim 17, wherein the step of calculating further comprises calculating a number of spindle rotations N for completion of each segment according to the relationship $N=(AB \cdot \cos \alpha)/(P \cos \theta)$.

19. The method of claim 17, wherein the initial radial position is a point along the valve seat profile that is radially closest to the vertical axis and radial movement of the cutting tool is directed away from the vertical axis.

20. The method of claim 17, wherein the initial radial position is a point along the valve seat profile that is radially farthest from the vertical axis and radial movement of the cutting tool is directed toward the vertical axis.

* * * * *